US012118080B2

(12) United States Patent
Harris et al.

(10) Patent No.: US 12,118,080 B2
(45) Date of Patent: *Oct. 15, 2024

(54) ANOMALY DETECTION FOR VEHICULAR NETWORKS FOR INTRUSION AND MALFUNCTION DETECTION

(71) Applicant: BATTELLE MEMORIAL INSTITUTE, Columbus, OH (US)

(72) Inventors: Brad Harris, Cottageville, SC (US); Anuja Sonalker, Eillicott City, MD (US); Kevin Mayhew, Abingdon, MD (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 781 days.

This patent is subject to a terminal disclaimer.

(21) Appl. No.: 16/556,883

(22) Filed: Aug. 30, 2019

(65) Prior Publication Data

US 2019/0392142 A1  Dec. 26, 2019

Related U.S. Application Data

(63) Continuation of application No. 15/700,589, filed on Sep. 11, 2017, now Pat. No. 10,437,992, which is a
(Continued)

(51) Int. Cl.
*G06F 21/55* (2013.01)
*G06N 20/00* (2019.01)
*G06N 20/10* (2019.01)

(52) U.S. Cl.
CPC ........... *G06F 21/554* (2013.01); *G06N 20/00* (2019.01); *G06N 20/10* (2019.01)

(58) Field of Classification Search
CPC ...... G06F 21/554; G06N 20/00; G06N 20/10; G08G 1/0967; B60R 1/00
See application file for complete search history.

(56) References Cited

U.S. PATENT DOCUMENTS 7,711,174 B2 * 5/2010 Sammak ............... G06T 7/0012
424/278.1
7,715,961 B1 * 5/2010 Kargupta ............... G06Q 10/08
701/33.2
(Continued)

OTHER PUBLICATIONS

Title: Intrusion detection using neural based hybrid classification methods Author: M. GOvindarajan, RM. Chandrasekaran Date: 2010 Publisher: Elsvier.*
(Continued)

*Primary Examiner* — William S Powers
*Assistant Examiner* — Gita Faramarzi
(74) *Attorney, Agent, or Firm* — Lippes Mathias LLP

(57) ABSTRACT

A security monitoring system for a Controller Area Network (CAN) comprises an Electronic Control Unit (ECU) operatively connected to the CAN bus. The ECU is programmed to classify a message read from the CAN bus as either normal or anomalous using an SVM-based classifier with a Radial Basis Function (RBF) kernel. The classifying includes computing a hyperplane curvature parameter $\gamma$ of the RBF kernel as $\gamma = f(D)$ where $f( )$ denotes a function and D denotes CAN bus message density as a function of time. In some such embodiments $\gamma = f(Var(D))$ where $Var(D)$ denotes the variance of the CAN bus message density as a function of time. The security monitoring system may be installed in a vehicle (e.g. automobile, truck, watercraft, aircraft) including a vehicle CAN bus, with the ECU operatively connected to the vehicle CAN bus to read messages communicated on the CAN bus.

20 Claims, 2 Drawing Sheets

Related U.S. Application Data continuation of application No. 14/857,016, filed on Sep. 17, 2015, now Pat. No. 9,792,435.

(60) Provisional application No. 62/097,869, filed on Dec. 30, 2014.

(56) References Cited

U.S. PATENT DOCUMENTS

| | | | |
|---|---|---|---|
| 8,099,452 B2* | 1/2012 | Chkodrov | G06F 9/542 |
| | | | 709/201 |
| 8,266,393 B2* | 9/2012 | Moscibrod | G06F 13/1652 |
| | | | 711/E12.001 |
| 8,275,175 B2* | 9/2012 | Baltatu | G06V 40/172 |
| | | | 382/118 |
| 8,280,828 B2 | 10/2012 | Perronnin et al. | |
| 8,594,385 B2* | 11/2013 | Marchesotti | G06T 7/0002 |
| | | | 382/112 |
| 9,606,154 B2* | 3/2017 | Song | G01R 19/2513 |
| 9,996,694 B2* | 6/2018 | Sethumadhavan | G06F 21/52 |
| 2005/0015424 A1* | 1/2005 | Aguilera | H04L 41/00 |
| | | | 709/200 |
| 2006/0039593 A1 | 2/2006 | Sammak et al. | |
| 2007/0289013 A1* | 12/2007 | Lim | G06F 21/552 |
| | | | 726/22 |
| 2008/0201278 A1* | 8/2008 | Muller | G06K 9/6284 |
| | | | 706/12 |
| 2010/0172542 A1* | 7/2010 | Stein | G06V 20/588 |
| | | | 348/148 |
| 2011/0160951 A1 | 6/2011 | Ishigooka et al. | |
| 2011/0258044 A1 | 10/2011 | Kargupta | |
| 2012/0078440 A1* | 3/2012 | Oravis | F41G 3/22 |
| | | | 701/1 |
| 2012/0269425 A1 | 10/2012 | Marchesotti et al. | |
| 2013/0078725 A1* | 3/2013 | Makki | G06N 20/10 |
| | | | 436/37 |
| 2014/0297707 A1 | 10/2014 | Osa | |
| 2014/0330866 A1 | 11/2014 | Hess et al. | |
| 2014/0334719 A1 | 11/2014 | Takenaka et al. | |
| 2015/0185262 A1 | 7/2015 | Song et al. | |
| 2016/0078353 A1 | 3/2016 | Shen et al. | |
| 2016/0173513 A1 | 6/2016 | Rohde et al. | |
| 2016/0275289 A1 | 9/2016 | Sethumadhavan | |
| 2017/0264439 A1 | 9/2017 | Muhanna | |

OTHER PUBLICATIONS

Title: Enhancing One-class Support Vector Machines for Unsupervised Anomaly Detection Author: Mennatallah Amer, Markus Goldstein, and Slim Abdennadher Date: 2013 Publisher:ODD.*

Title: Detecting anomalies in multivariate time series from automative systems Auther: Andreas Theissler Date: 2013 Publisher: Brunel University.*

Title: SVM Kernel Functions for Classification Auther: Arti Patle, Deepak Singh Chouhan Date: 2013 Publisher: IEEE.*

Author: Andreas Theissler Title: Detecting anomalies in multivariate time series from automotive systems Year:2013 Publisher: Brunel University London (Year: 2013).*

Author: Arti Patle and Deepak Singh Chouhan Title: SVM Kernel Functions for Classification Year:2013 Publisher: IIEEE (Year: 2013).*

Theissler; Detecting anomalies in multivariate time series from automotive systems; Brunel University London, United Kingdom; School of Engineering & Design; Dec. 9, 2013.

* cited by examiner

ANOMALY DETECTION FOR VEHICULAR NETWORKS FOR INTRUSION AND MALFUNCTION DETECTION

This application is a continuation of U.S. Ser. No. 15/700,589 filed Sep. 11, 2017 which is a continuation of U.S. Ser. No. 14/857,016 filed Sep. 17, 2015, which claims the benefit of U.S. Provisional Application No. 62/097,869 filed Dec. 30, 2014. These applications are incorporated herein by reference in their entireties.

BACKGROUND

The following relates to the machine classification arts, embedded system arts, automotive network analysis arts, and related arts.

Vehicles (automobiles, trucks, watercraft, aircraft, et cetera) are increasingly utilizing embedded electronic systems. In the automotive context, embedded system units are usually referred to as Electronic Control Units (ECUs), and are commonly networked on a Controller Area Network bus (CAN bus). In a typical communication protocol, a message includes a header, typically including a message identifier followed by a set of data bytes (e.g. 8 bytes=64 bits). In standard automotive CAN bus architectures, the message ID is 11 bits (2048 possible message IDs) or 29 bits (~500 million possible message IDs). Some CAN bus architectures can support both 11-bit and 29-bit message IDs. Collisions are arbitrated by prioritizing the message ID with the most leading zeros; the lower priority message is then re-sent after a specified delay.

There is an expectation in the automotive industry (supported by governmental regulations in some instances) that the CAN bus architecture should be "open" in the sense that third-party manufacturers should be able to provide ECU-equipped components that can connect with an existing CAN bus. This creates a potential entry point for exploitation and challenges in providing CAN bus security against inadvertent glitches and intentional intrusion (e.g. hacking of an ECU or of the entire CAN bus network). Likewise, there are several new entry points for exploitation and pose challenges. A few examples of vulnerable entry points are the tire pressure monitoring system (TPMS), RADAR, LIDAR, camera, on-board diagnostics (e.g. OBD-II), USB, Bluetooth, Wifi enabled on-vehicle hotspots, and cellular connections. The consequences of an unintentional glitch or intentional hack can range from very minor (e.g. the car stereo volume decreasing) to very serious (e.g. loss of vehicle braking, uncontrolled engine acceleration, or aircraft flight control interference).

BRIEF SUMMARY

A security monitoring system for a Controller Area Network (CAN) comprises an Electronic Control Unit (ECU) operatively connected to the CAN bus. The ECU is programmed to classify a message read from the CAN bus as either normal or anomalous using an SVM-based classifier with a Radial Basis Function (RBF) kernel. The classifying includes computing a hyperplane curvature parameter $\gamma$ of the RBF kernel as $\gamma=f(D)$ where $f(\ )$ denotes a function and D denotes CAN bus message density as a function of time. In some such embodiments $\gamma=f(\mathrm{Var}(D))$ where $\mathrm{Var}(D)$ denotes the variance of the CAN bus message density as a function of time. The security monitoring system may be installed in a vehicle (e.g. automobile, truck, watercraft, aircraft) including a vehicle CAN bus, with the ECU operatively connected to the vehicle CAN bus to read messages communicated on the CAN bus. By not relying on any proprietary knowledge of arbitration IDs from manufacturers through their dbc files, this anomaly detector truly functions as a zero knowledge detector.

In accordance with one disclosed aspect, a Support Vector Machine (SVM) classifier training device comprises a computer (for example, a cloud-based computing resource, a parallel processor system, or a cluster computer) programmed to train an SVM one-class classifier using a Radial Basis Function (RBF) kernel to perform security monitoring of a controller area network (CAN) bus employing a message-based communication protocol by operations including: receiving a training set comprising vectors with associated times representing CAN bus messages; calculating a hyperplane curvature parameter $\gamma$ functionally dependent on message density in time (for example, in some embodiments $\gamma=f(D)$ or $\gamma=f(\mathrm{Var}(D))$ where $f(\ )$ denotes a function, D denotes message density in time, and $\mathrm{Var}(D)$ denotes variance of the message density in time); and training the SVM classifier on the training set using the calculated $\gamma$. The operations may further include determining a hyperplane granularity parameter $\varepsilon$ by repeating the training for a grid of candidate $\varepsilon$ values using a grid search. In some embodiments the training set comprises CAN bus messages acquired over at least one time interval from a vehicle, and the computer is further programmed to generate an SVM-based anomaly detector configured to execute on a vehicle-grade Electronic Control Unit (ECU) based on the trained SVM one-class classifier, for example by operations including replacing the calculated high precision hyperplane curvature parameter $\gamma$ with a resource-constrained-hardware-compatible hyperplane curvature parameter $\gamma$.

In accordance with another disclosed aspect, a system includes a trained SVM one-class classifier configured by receiving information from a SVM classifier training system as set forth in the immediately preceding paragraph, an unseen ID unit configured to receive information from an observed ID list, and an alerting module configured to receive information from the unseen ID unit and the SVM classifier. The system may further include a vehicle including a vehicle CAN bus employing a message-based communication protocol and an ECU installed on the vehicle CAN bus and programmed to execute an anomaly detector comprising the trained SVM one-class classifier, the unseen ID unit, and the alerting module.

In accordance with another disclosed aspect, a security monitoring system for a Controller Area Network (CAN) comprises an Electronic Control Unit (ECU) operatively connected to a CAN bus to read messages communicated on the CAN bus. The ECU is programmed to perform a security monitoring method comprising classifying a message read from the CAN bus as either normal or anomalous using an SVM-based classifier with a Radial Basis Function (RBF) kernel. The classifying includes computing a hyperplane curvature parameter $\gamma$ of the RBF kernel as $\gamma=f(D)$ where $f(\ )$ denotes a function and D denotes CAN bus message density as a function of time. In some such embodiments $\gamma=f(\mathrm{Var}(D))$ where $\mathrm{Var}(D)$ denotes the variance of the CAN bus message density as a function of time.

In accordance with another disclosed aspect, a vehicle comprises an automobile, truck, watercraft, or aircraft including a vehicle CAN bus, and a security monitoring system as set forth in the immediately preceding paragraph

DETAILED DESCRIPTION

Figure 1:
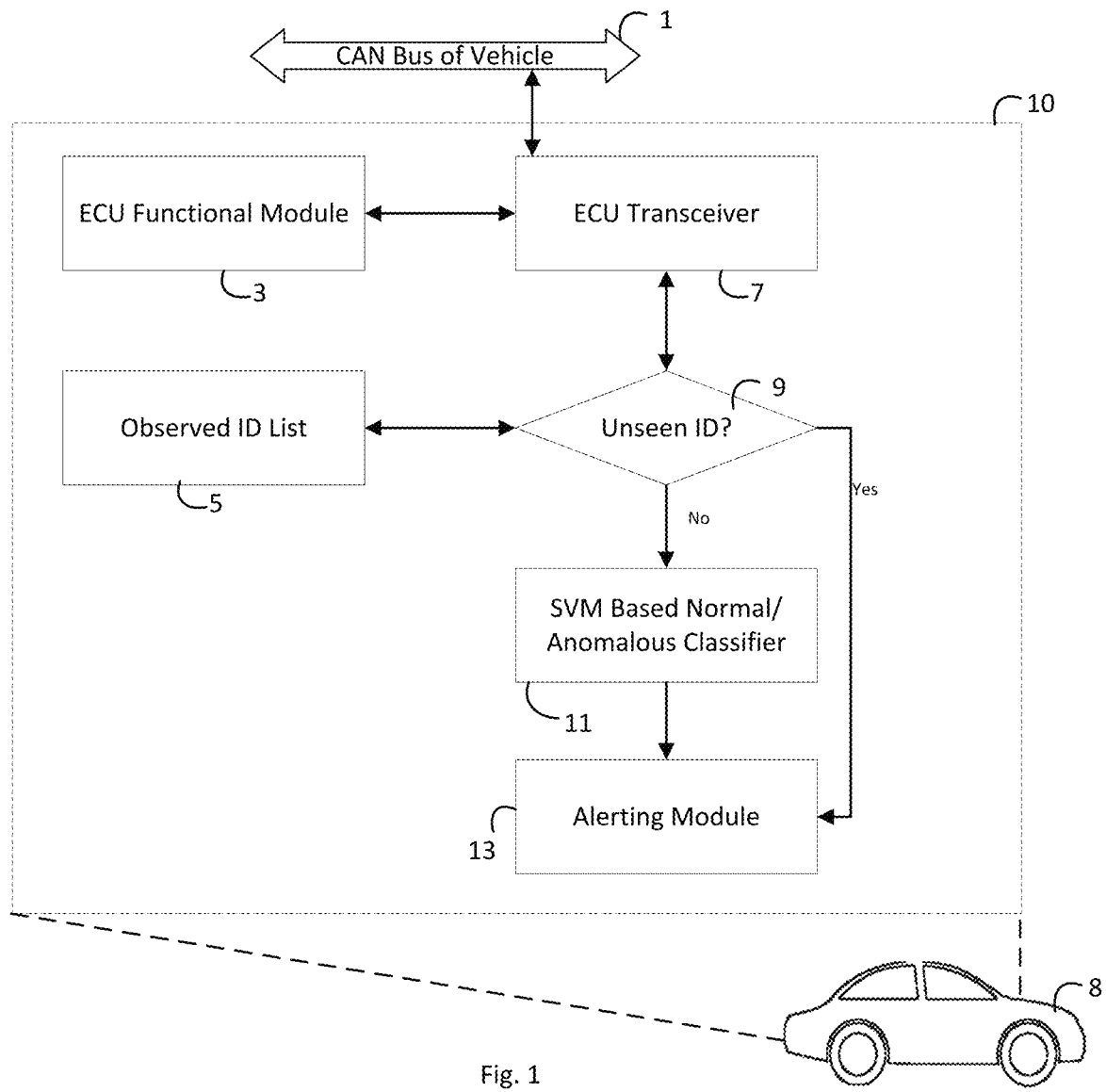
FIG. 1 diagrammatically illustrates a vehicle CAN network security monitoring system in accord with illustrative embodiments disclosed herein.

An approach to CAN bus security in the face of "zero knowledge" context is zero knowledge anomaly detection. In a rough conceptual sense, an anomaly is either a glitch or an intrusion (e.g. hacking)—more generally, CAN bus traffic that should not be present. In the CAN bus context, a priori knowledge of what types of messages may be transmitted by a given ECU may be limited (e.g. due to traffic introduced by aftermarket components connected with the CAN bus). The disclosed zero knowledge anomaly detection does not rely on any proprietary knowledge of arbitration IDs from manufacturers through their dbc files—thus, the disclosed anomaly detector truly functions as a zero knowledge detector.

As used herein, an anomaly is defined as follows: an anomaly is a statistically significant deviation from normal CAN bus behavior as gleamed from CAN bus message traffic. "Statistically significant" means that the deviation from normal CAN bus behavior is sufficient, measureable and greater than the allowable limit. An anomaly detection system can be constructed based on statistical analysis of a training data set consisting of CAN bus traffic acquired from a vehicle known to be operating normally. For example, training data can be acquired at the automobile manufacturer facility, using a vehicle straight off the assembly line, or a pre-production model, or some other vehicle. This approach is unusual in that the training data are all "negative" samples, that is, all of the training data are "normal" and none of the training data are anomalies. Thus, ideally, after training on such data the anomaly detection system should not generate any anomaly alerts.

In approaches disclosed herein, the anomaly detection algorithm comprises a Support Vector Machine (SVM) trained to operate as a one-class classifier outputting either a positive value (indicating an anomaly) or a negative value (indicating a normal message). (The one-class classifier can also be thought of as a binary classifier in which one "class" is "anomaly" and the other "class" is "normal message" or "not anomaly"). Each message is treated as a vector residing in a high-dimensional vector space. For example, in one CAN bus architecture a message includes (in time-order): an 11-bit message ID (optionally with an additional 18-bit extension message ID); a network ID denoting the network bus the message arrived on; and eight data bytes. This can be represented by a vector having ten dimensions: one dimension for the message ID; one dimension for the network (or BUS) ID; and eight additional dimensions for the eight respective data bytes. In the SVM paradigm, the training set consists of a set of training vectors, and a sub-set of the training vectors forms the set of Support Vectors. A hyperplane is defined respective to the Support Vectors that is optimized by the SVM training to separate positive samples from negative samples while maximizing margins to the nearest training samples in the vector space. The illustrative one-class SVM classifier employs a Radial Basis Function (RBF) as the kernel for defining the hyperplane. Representing a Support Vector by x and a (message) vector to be classified by y, the RBF $f(x, y)$ is defined as:

$$f(x,y)=e^{-\gamma((x_1-y_1)^2+(x_2-y_2)^2+\ldots+(x_D-y_D)^2)} \quad (1)$$

where D is the number of dimensions of the vectors (e.g. D=10 in the illustrative CAN bus message with a message and a network ID element and eight data bytes) and $\gamma$ characterizes the curvature of the RBF kernel $f(x, y)$. During SVM training, the Support Vectors are chosen from the training sub-set by the SVM training algorithm so as to provide positive/negative sample segregation with maximized margins, typically subject to additional constraints defined by tuning parameters.

In a typical SVM approach, the tuning parameters include the already-mentioned $\gamma$ parameter, which controls the shape or curvature of the separating hyperplane. A larger value of $\gamma$ increases hyperplane curvature and also tends to increase the number of Support Vectors chosen during the SVM training. Another tuning parameter, $\nu$, defines a lower bound on the number of Support Vectors, and also presents an upper bound on the number of training samples that may be erroneously classified (this error count can be reduced by forced adding of Support Vectors). A tuning parameter $\varepsilon$ defines a penalty for data points inside the margin (i.e. too close to the hyperplane), and may be viewed as controlling granularity of the hyperplane.

Conventionally, SVM training is performed as follows. The tuning parameters $\gamma$, $\nu$, $\varepsilon$ (or additional or other tuning parameters depending upon the particular SVM model being employed) are chosen, and SVM training is performed to optimize selection of the Support Vectors so as to optimally segregate positive from negative samples while satisfying constraints defined by the tuning parameters $\gamma$, $\nu$, $\varepsilon$. In the conventional approach, the user may then choose to adjust the tuning parameters $\gamma$, $\nu$, $\varepsilon$ and repeat the training, so as to tune the SVM classifier by trial-and-error. After the training phase is complete, the trained SVM classifier is applied to classify a new message represented by the message vector y according to:

$$\sum_{i=1}^{N} f(x_i, y) > \rho \quad (2)$$

where $f$ is given in Expression (1), the tuning parameters $\gamma$, $\nu$, $\varepsilon$ from the training are used, N is the number of support vectors chosen by the SVM training, and the vectors $z_1, \ldots, x_N$ are the Support Vectors chosen by the training. The message y is classified as anomalous if the sum in Expression (2) is greater than the threshold $\rho$ because it is too far away from the trained hyperplane; otherwise, the message is classified as normal. Since the parameter $\varepsilon$ relates to the margin around the trained hyperplane, in some embodiments the threshold $\rho = N\varepsilon$ is used in Expression (2).

In the vehicle CAN network security context, some difficulties arise in applying the foregoing conventional approach. One issue pertains to scalability. The choice of tuning parameters $\gamma$, $\nu$, $\varepsilon$ may be expected to vary widely depending upon the particulars of the CAN bus traffic. In particular, the inventors have found that the optimal choice of the hyperplane curvature $\gamma$ depends on the CAN bus message density as a function of time. However, this density varies both during vehicle operation and from vehicle to vehicle. For example, a vehicle executing a panic braking procedure may have a much higher CAN bus traffic density as compared with a vehicle idling at a traffic light; similarly, a high-end vehicle model may include a number of features that are not present on the base model, such as high end stereo, DVD player, advanced fuel economy and brake systems, and so forth, thus requiring more ECUs and more CAN bus traffic. Another difficulty relates to the available training data. A "zero knowledge" about anomalies is being assumed, so that the available training data are only normal messages, without any anomalous messages being available. (As previously noted, it is contemplated to add some anomalous messages to the training data, but in view of the zero knowledge assumption there is concern about whether the added anomalies are truly representative of anomalies that may occur during actual vehicle operation).

To learn the normal behavior of a vehicle and create the hyperplane, an Anomaly Detection Algorithm (ADA) is used. The ADA uses an iterative approach to building the model. The following ADA training example will refer to the "first 50,000 messages;" however, it is to be understood that 50,000 is merely an example number, and any number of messages could be used. The ADA reads the first 50,000 messages (configurable parameter) from an acquired dataset, divides them into 10 folds (configurable parameter), and generates a training model using 9 folds and tests it for total number of false positives on the 10th fold. This process is repeated until each of the 10 folds is exhausted for validation. This procedure is called cross-validation and the dataset containing the first 50,000 messages may be referred to as the original subset. At the end of cross-validation, ten candidate models are created. The best performing candidate model (the one with the lowest number of false positives) is selected and the rest are discarded. This generates the first hyperplane that represents normal operation of the vehicle. The selected model is then used to evaluate the entire dataset, and emerging false positives recorded. The algorithm stops evaluation once either 50,000 (configurable parameter) false positives are generated, or it reaches the end of the dataset. The 50,000 false positives thus generated are added to the original subset of 50,000 messages thereby creating an appended subset of 100,000 messages and the model building process above is repeated. This build process continues iteratively until it reaches the end of the acquired dataset. If fewer than 50,000 false positives are generated in an iteration before end of dataset is reached, (usually happens in the final iteration) then the false positives generated in this iteration are added to the appended subset as is and a final iteration of the build process occurs. The result of the final iteration becomes the final trained model. This final trained model contains the hyperplane that represents normal behavior for the vehicle as represented by the acquired dataset. It will be appreciated that this is one illustrative example of using cross-validation, i.e. dividing the training data set into training and testing sub-sets, and other training/testing data partitioning paradigms are also contemplated.

Further, while the illustrative embodiments designate a normal message as a negative classifier output and an anomalous message as a positive classifier output, these designations could be reversed. If a positive classifier output is designated as "normal" and negative output as "anomaly," then the training (on "all-normal" training data) suitably seeks to minimize false negatives.

The foregoing is an illustrative example of an SVM; more generally, there are numerous variant SVM designs, for example with different kernels, different parameterizations, and so forth. In general, SVMs use mathematical functions to map data into higher order dimensional spaces and generate a multi-dimensional hyper-plane to represent data patterns. SVMs are supervisory learning models in that they are first trained with appropriately labeled data from the classes that they are being used to detect. The training results in the generation of a multi-dimensional hyper-plane that represents the class of data that the SVM was trained on. Anomaly or positive detection occurs when the data point being evaluated falls outside of the learned class (hyperplane) by a reasonable Euclidian distance (maximum margin). The sensitivity of the detector is determined by the width of the margin and the smoothness of the hyper-plane. The smoothness of the hyper-plane is further dependent on the number of support vectors used to setup the hyper-plane. Support vectors are those data points that the margin pushes up against. They can be visualized as the points that prop up the hyper-plane.

The SVM is trained on the class of normal operational data that is observed on vehicular CAN network buses. For example, the SVM classifier is suitably trained on high and medium speed CAN buses that are the conduits for engine, power train, body control, infotainment control units of the vehicle.

The SVM employs a kernel basis function that approximates the nature of the data observed and generates the hyper plane. Commonly used SVM kernels in literature include Linear, Polynomial, RBF, and the Sigmoid Function. The illustrative ADA is built upon an RBF kernel. It is defined as:

$$K(x_i - x_j) = e^{-\gamma \|x_i - x_j\|^2} \text{ where } x \in \mathcal{R} \text{ and } \gamma > 0 \qquad (3)$$

where $\mathcal{R}$ is the set of all real numbers, gamma ($\gamma$) represents the curvature of the hyperplane, and $x_i$ and $x_j$ are features of the data. Each of the ten attributes available from the CAN data message are used as individual features resulting in a ten-dimensional hyper plane mapping. These include the Arbitration ID, BUS ID, and eight-byte CAN message payload.

Along with gamma ($\gamma$), also used are: nu ($\nu$) which represents (a lower limit on) the total number of support vectors to be used, and epsilon ($\varepsilon$) which determines the granularity of the curve. For compactness, the SVM tuning parameters $\nu$, $\varepsilon$, and $\gamma$ together are also referred to as the ADA triple.

In the illustrative ADA training, the inventors have found that $\nu=520$ is typically a suitable value, and in the illustrative SVM training procedure $\nu=520$ is set as a constant.

The parameter $\varepsilon$ is set using a grid search. In the illustrative training approach, $\varepsilon$ is the only one of the ADA triple that is selected via grid search and is tuned to the particular platform of the vehicle (e.g. vehicle make, model, and trim, including powertrain and options). The value of $\varepsilon$ in the grid search ranges from $[2^{-17}, 2^6]$ with a step increase in the exponent of 0.1. The algorithm progresses from a smaller value of epsilon to a larger one to avoid falling into a hole which is a local minimum of an optimization function. This local minimum will trap the grid search function into a value which is too large if the number of false positives happens to be lower at that point when compared with smaller but more useful values. The grid search uses cross-validation to identify the best value for c, and returns that value to be used in the generation of the final model.

The parameter $\gamma$ represents the hyperplane curvature. Conventionally, the tuning parameters $\gamma$, $\varepsilon$, and $\nu$ are constants. While they may be tuned by trial-and-error or using a grid search or the like during the SVM training process, the learned SVM conventionally employs fixed values for tuning parameters γ, ε, and ν. However, the inventors have found that for the application of detecting anomalies in automotive CAN bus traffic, the optimal value for the hyperplane curvature γ varies as a function of CAN bus traffic density. In techniques disclosed herein, this is accommodated in both the training and inference phases by constructing γ as a function of message density D, that is, γ=ƒ(D) where ƒ( ) denotes a function. In particular instances, the inventors have found that γ=ƒ(Var(D)) is suitable, where Var(D) is the CAN bus message density variance.

In one suitable embodiment, the hyperplane curvature parameter γ is calculated as follows:

$$\gamma = \frac{1}{2*\mathrm{Var}(D)} - 1.8*10^{-((\log_{10} Var(D))+2)} \quad (4)$$

where Var(D) represents the message density variance. While Expression (4) is an illustrative example, more generally, the hyperplane curvature parameter γ preferably varies with the inverse of the "spread" of the message density D:

$$\gamma \propto \frac{1}{\mathrm{Var}(D)} \quad (4a)$$

where the fractional term (reciprocal variance) is indicative of the weight of the data points that are represented by the message density variance Var(D). This reduces the effect of random errors, if present, in the variation of the message density. It is recognized herein that this weight directly impacts the curvature of the hyperplane represented by γ, and can be used to determine γ. In Expression (4a), it is contemplated to replace Var(D) with another "spreading metric" of the message density, such as the standard deviation ($\sigma=\sqrt{\mathrm{Var}(D)}$).

The message density D in Expression (4) calculates the number of messages received during a given time window. It acts as a first in first out (FIFO), queuing the current time window's worth of messages; thus, a queue is created. The function receives a message, calculates the time difference between the oldest message time stamp in the FIFO and the new time stamp. When the difference of these two time stamps is greater than the time window, the function iterates over the queue removing the messages with time stamps outside the time window. The resulting length is the number of messages that were received over the given time window per the current iteration. This function is called repetitively over the entire data set. The result is an array containing the message density at the time of each individual message. That is, the array contains as many densities as the generation subset has messages. The average, standard deviation, and variance of message density is calculated from this array. While this is one illustrative approach, other approaches can be employed for estimating the message density variance Var(D) at a particular message in the CAN bus message stream.

The model training can be performed offline using powerful computing resources, such as a parallel computer system, a computing cluster, a cloud computing resource or other set of multiple-processors and/or networked computer system. On the other hand, the trained SVM anomaly classifier is implemented on an automotive-grade Electronic Control Unit (ECU) which typically includes greatly reduced computing and data storage resources as compared with the training system, and cannot be reliably networked (for example, even if the automobile is provided with a wireless communication link, this communication cannot be deemed "always on" since it could be lost in remote areas without network coverage, or when passing through a tunnel, or so forth). Thus, the implemented SVM classifier (that is, the inference phase) typically entails a loss of precision, for example due to limited processor capacity, limited floating point hardware and so forth. To compensate for this loss of precision, a Gamma Delta ($\gamma_\delta$) compensation factor is created. This value is used in computing the hyperplane curvature in the inference phase, and helps stabilize the Support Vector Machine during message classification. In a suitable embodiment, $\gamma_\delta$ is calculated as:

$$\gamma_\delta = 2.2*10^{-((log_{10} Var(D))+3)} \quad (3)$$

(more generally, $\gamma_\delta \propto \mathrm{Var}(D)$, or even more generally $\gamma_\delta$ is at least approximately proportional to a "spreading function" of the message density D, such as the variance or the standard deviation). Then, γ is calculated during the inference phase as:

$$\gamma = \gamma_\delta - \frac{1}{2*\mathrm{Var}(D)} = 2.2*10^{-((\log_{10} Var(D))+3)} - \frac{1}{2*\mathrm{Var}(D)} \quad (6)$$

or more generally, γ=$\gamma_\delta$–Original (γ). Expression (6) suitably replaces Expression (4) as the hyperplane curvature γ during the inference phase performed on the ECU. The rationale for this substitution is as follows. To adjust for precision losses in γ, as well as in the resulting inference calculations, the new y used on the inference side (on the in-vehicle hardware platform) is adjusted to the nearest value that results in the same support vector calculations as those achieved on the training side using precision processors. The adjustment factor, referred to as a compensation factor gamma delta, was found to vary proportionately with the message density variance.

Evaluation

The evaluation phase performed on the ECU is next described. The evaluation phase is independent of the training phase, but uses the Support Vectors chosen during the training phase, along with the tuned γ=ƒ(Var(D)) and the grid-selected value for ε, and ν=520 which was used in the training phase. This independent design enables the SVM anomaly classifier training to take place independently and in a high performance computing environment (e.g., a datacenter, cloud, or manufacturer test platform) while providing the flexibility of running the evaluation phase from an embedded ECU with relatively reduced computing capacity. The evaluation phase is run directly on-vehicle through a module that connects to the vehicle's network through an on board diagnostics (OBD-II) port. The evaluation phase can run directly on-vehicle ECU, internal to the vehicle.

The disclosed ADA processes each CAN bus message to determine whether it is normal or anomalous. It is contemplated for the ADA, which operates on a "zero knowledge" basis, to be employed in combination with other anomaly detection techniques, including for example techniques that rely on some additional knowledge. For example, an "unseen ID" anomaly detector may be employed in combination with the ADA. The unseen ID anomaly detector is a comparator that looks for the first occurrence of an Arbitration ID. The occurrence of a new Arbitration ID/Bus ID pair is always captured as an anomaly whereas all previously seen Arbitration IDs are passed on to the ADA. In a variant approach, the unseen ID anomaly detector includes a list of all ID's observed in the training set used for training the SVM-based ADA classifier, and any ID observed during vehicle operation that is not in this list of IDs from the training set is automatically flagged as anomalous. This approach assumes that the training data set of normal messages is substantially all-encompassing, so that any message not included in the list of IDs extracted from the SVM training data is most likely an anomaly.

The ADA evaluator is loaded to the ECU with the final model that was created at the end of the training phase. The values are stored in $x_{(1, \ldots, n)}$ per support vector, e.g., $x_{(1, \ldots, n), 520}$, where n is the number of message elements used as features, e.g. n=10 if the message includes an arbitration ID, network ID, and eight data bytes. When a new message comes in for ADA evaluation, the parsed values are stored in $y_1, \ldots, y_n$, that is, $y_{1:n}$.

The evaluation function is then calculated for each of the 520 support vectors as:

$$f(x,y) = e^{-\gamma((x_1-y_1)^2 + \ldots + (x_n-y_n)^2)} \quad (7)$$

which entails computation of Euclidian distance for comparison of distance of the incoming values to the trained values. These are summed over the 520 Support Vectors (more generally, N Support Vectors) to yield the classifier output:

$$\sum_{i=1}^{N} f(x_i, y) > \rho \quad (8)$$

If the sum is greater than the threshold $\rho$ then the corresponding incoming message is flagged as anomalous. In some contemplated embodiments, $\rho = N\epsilon$.

In the illustrative vehicle security monitoring, a single message flagged as anomalous by the ADA is not deemed to be sufficient to generate an anomaly alert. This is because the ADA operates in a "zero knowledge" framework, and hence a single anomalous message is not deemed sufficient to justify issuing an alert. Rather, an alerting framework is employed in the illustrative embodiment. All anomalies detected by the various detectors are aggregated by the alerting framework as they occur. In one suitable approach, a count of anomalies detected within a particular window of time is generated. The logic here is that stray anomalies by themselves do not signal an event, however, multiple anomalies arriving close together (or independently flagged by several detectors, e.g. by the ADA and/or by the unseen ID detector, is suggestive of an actionable event. In one approach, the alerting framework is set to alert that an actionable event is underway if at least 10 anomalies are received within 30 seconds. Both numbers are parameters that can be modified to suit different levels of sensitivity, that is, in general an actionable event is underway if at least N anomalies are observed in T seconds. In one approach, the security monitoring system comes out of alert (reset condition) when 30 seconds have passed with no anomaly detected, but again other reset criteria can be employed.

Figure 2:
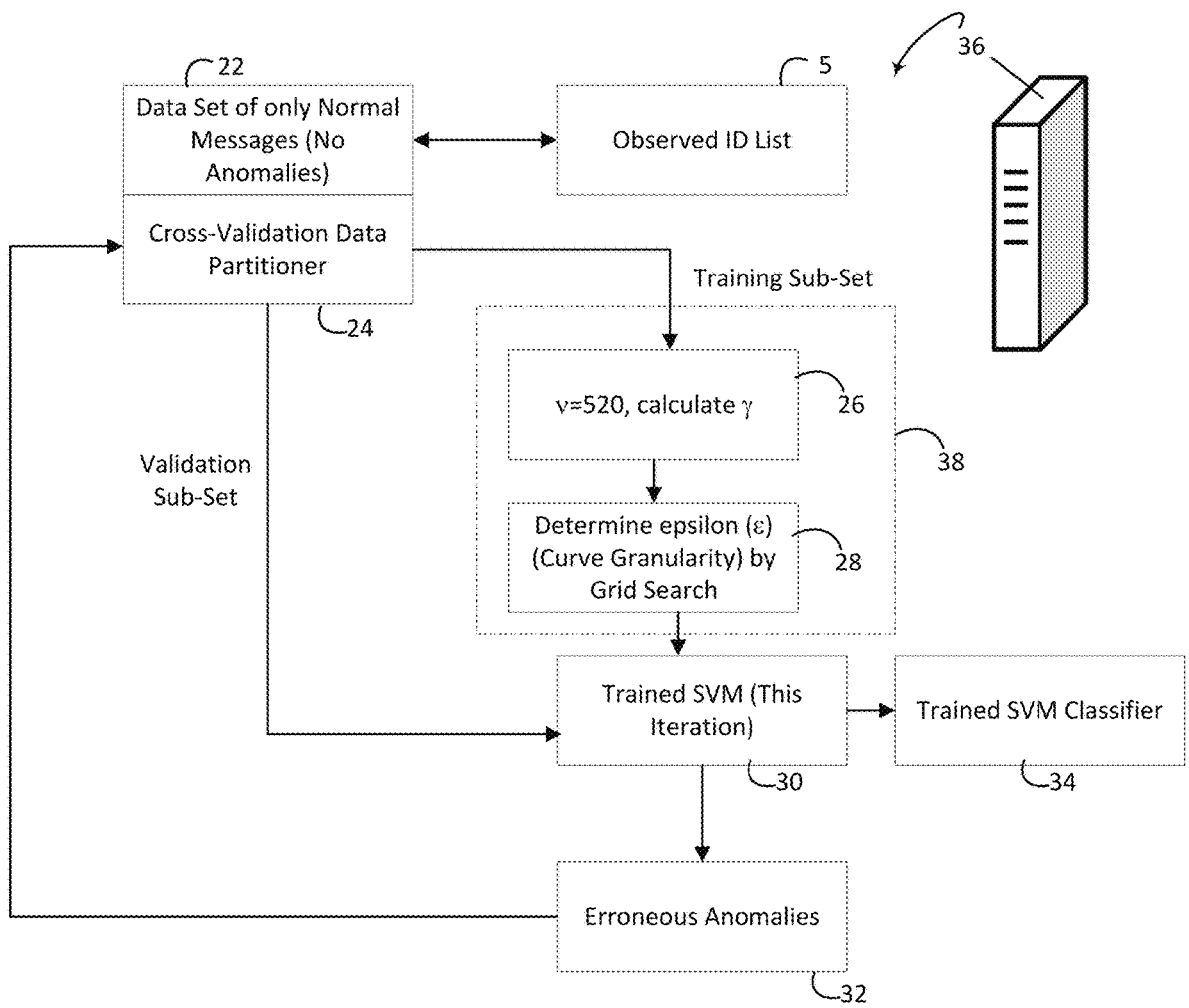
FIG. 2 diagrammatically shows a classifier training system configured to train the SVM-based anomaly classifier of FIG. 1 in accord with illustrative embodiments disclosed herein.

With reference to FIGS. 1 and 2, an illustrative embodiment is shown, including the embedded system comprising an ECU (FIG. 1) and the training system (FIG. 2).

With particular reference to FIG. 1, a vehicle 8, such as an illustrative automobile, includes an ECU 10 comprises a microprocessor or microcontroller and ancillary electronics (e.g. memory, the illustrative transceiver 7, or so forth) programmed to provide the desired functionality. This functionality is represented in the inset diagram representing the ECU 10 as an ECU functional module 3. For example, the ECU functional module 3 may provide engine control, brake control, entertainment system operation, or so forth. The ECU 10 is installed on the CAN bus of a vehicle 1.

The ECU 10 stores an observed ID list 5, which is used to check if an ID is unseen (e.g., the ID is not on the observed ID list 5) in operation 9 (corresponding to the previously mentioned "unseen ID" detector). If an ID is unseen, an indication will be sent to alerting module 13. If the ID is not unseen (e.g., it is on the observed ID list 5), then the trained SVM based normal/anomalous classifier 11 determines whether the message is anomalous, and if anomalous this will be indicated to the alerting module 13. The alerting module monitors the anomaly occurrences and issues an anomaly alert if suitable criteria are met, such as the previously described criterion of at least 10 anomalies occurring in any 30 second time interval.

With particular reference to FIG. 2, the SVM classifier 11 of the ECU 10 of FIG. 1 is trained as follows. The one-class SVM classifier training is suitably performed by a high-capacity computing system 36, such as an illustrative server computer, which may be cloud-based (i.e. a cloud computing resource), a parallel processor system, cluster computer, or so forth. The training is performed using a data set of only normal messages 22 represented as vectors as described herein (e.g. one or two dimensions for message/network ID information, and eight dimensions for the data bytes). The dataset of only normal messages 22 is also suitably used to create or modify the observed ID list 5 used by the unseen ID detector 9 of FIG. 1.

The dataset of only normal messages 22 is used by cross-validation data partitioner 24 to feed groups of messages into the training system. In each iteration 38 of the training, the tuning parameters are set as follows: in operation 24 v=520 is set and γ is computed in accord with Expression (4) (or using another formula dependent upon message density D, or more particularly dependent upon message density variance Var(D)). In an operation 28, the grid search to optimize ε is performed—for each value of ε in the search grid, an SVM training algorithm is invoked to select the N Support Vectors as constrained by v and with hyperplane curvature set to γ, and the SVM providing the fewest false positives is selected as the output of the iteration 38, along with its ε.

The trained SVM 30 for that iteration is applied to the testing data from the cross-validation data partitioner 24, and erroneous anomalies from that iteration are added to the training data set for the next iteration so that erroneous anomalies may be "learned" out. The iterative process terminates in response to a suitable termination criterion (e.g. running out of training data, or the number of false positives falls below a threshold, or the iteration-to-iteration improvement becomes less than a stopping threshold, et cetera). The trained SVM classifier 34 is then further processed (for example by substituting γ of Expression (6) for the γ of Expression (4)) to generate the SVM-based anomaly classifier 11 of the embedded system of FIG. 1.

While the disclosed SVM classifiers have been discussed in automotive context (automobiles, trucks, et cetera), it will be appreciated that they also apply to other vehicles such as watercraft, aircraft, locomotives, or so forth, as well as to other, relatively isolated, systems that are amenable to employing embedded systems, such as ocean buoys, orbiting satellites, and the like.

It will further be appreciated that the disclosed techniques may be embodied as a non-transitory storage medium storing instructions readable and executable by a computer, (microprocessor or microcontroller of an) embedded system, or various combinations thereof. The non-transitory storage medium may, for example, comprise a hard disk drive, RAID or the like of a computer; an electronic, magnetic, optical, or other memory of an embedded system, or so forth.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A Support Vector Machine (SVM) classifier training system comprising:
a computer programmed to train a Support Vector Machine (SVM) one-class classifier using a Radial Basis Function (RBF) kernel to perform anomaly monitoring of a controller area network (CAN) bus employing a message-based communication protocol by operations including:
receiving a training set comprising vectors with associated times representing CAN bus messages;
calculating a hyperplane curvature parameter ($\gamma$) functionally dependent on CAN bus message density in time; and
training the SVM one-class classifier on the training set using the calculated hyperplane curvature parameter ($\gamma$).

2. The SVM classifier training system of claim 1 wherein the operations further include:
determining a hyperplane granularity parameter ($\epsilon$) by repeating the training for a grid of candidate hyperplane granularity parameter ($\epsilon$) values using a grid search.

3. The SVM classifier training system of claim 1 wherein the computer comprises a cloud-based computing resource, a parallel processor system, or a cluster computer.

4. The SVM classifier training system of claim 1 wherein the RBF kernel is a kernel K calculated using the equation:

$$K(x_i - x_j) = e^{-\gamma \|x_i - x_j\|^2} \text{ where } x \in \mathcal{R} \text{ and } \gamma > 0$$

where $\mathcal{R}$ is the set of all real numbers, $\gamma$ represents the curvature of the hyperplane, and $x_i$ and $x_j$ are features of the training set.

5. The SVM classifier training system of claim 1 wherein $\gamma = f(D)$ where $f( )$ denotes a function and D denotes CAN bus message density in time.

6. The SVM classifier training system of claim 1 wherein $\gamma = f(\sqrt{Var(D)})$ where $f( )$ denotes a function and D denotes CAN bus message density in time and Var(D) denotes variance of the CAN bus message density in time.

7. The SVM classifier training system of claim 1 wherein the data set contains only normal messages of a CAN bus and the training comprises training the SVM one-class classifier to minimize one of (i) false positives and (ii) false negatives.

8. The SVM classifier training system of claim 1 wherein the operations further comprise:
setting a tuning parameter ν specifying a minimum number of Support Vectors to 520.

9. The SVM classifier training system of claim 1 wherein the computer is further programed to:
receive at least one additional training subset; and
repeat the operations performed on the training set on the at least one additional training subset.

10. The SVM classifier training system of claim 1 wherein the training set comprises CAN bus messages acquired over at least one time interval from a vehicle, and the computer is further programmed to:
generate an SVM-based anomaly detector configured to execute on a vehicle-grade Electronic Control Unit (ECU) based on the trained SVM one-class classifier.

11. The SVM classifier training system of claim 10 wherein the operation of generating the SVM-based anomaly detector configured to execute on a vehicle-grade ECU comprises:
replacing the calculated hyperplane curvature parameter ($\gamma$) with a resource-constrained-hardware-compatible hyperplane curvature parameter ($\gamma$).

12. A system comprising:
a Support Vector Machine (SVM) classifier training system comprising a computer programmed to train an SVM one-class classifier using a Radial Basis Function (RBF) kernel to perform anomaly monitoring of a controller area network (CAN) bus employing a message-based communication protocol by operations including receiving a training set comprising vectors with associated times representing CAN bus messages, calculating a hyperplane curvature parameter ($\gamma$) functionally dependent on CAN bus message density in time; and training the SVM one-class classifier on the training set using the calculated hyperplane curvature parameter ($\gamma$)
a vehicle including a vehicle CAN bus employing a message-based communication protocol, and an electronic control unit (ECU) installed on the vehicle CAN bus and including a microprocessor or microcontroller and an ECU transceiver, the ECU programmed to execute an anomaly detector comprising a trained SVM one-class classifier configured by receiving information from the SVM classifier training system.

13. The system of claim 12, wherein:
the anomaly detector further comprises an unseen ID unit that receives a message from the ECU transceiver and:
if the unseen ID unit determines that the message is not on an observed ID list, the unseen ID unit outputs a binary indicator indicating that message is not on the observed ID list; and
if the unseen ID unit determines that the message is on the observed ID list, the unseen ID unit outputs the message to the trained SVM one-class classifier.

14. An anomaly monitoring system for a Controller Area Network (CAN) comprising an Electronic Control Unit (ECU) operatively connected to a CAN bus to read messages communicated on the CAN bus, the ECU programmed to perform an anomaly monitoring method comprising:
classifying a message read from the CAN bus as either normal or anomalous using an SVM-based classifier with a Radial Basis Function (RBF) kernel;
wherein the classifying includes computing a hyperplane curvature parameter $\gamma$ of the RBF kernel as $\gamma = f(D)$ where $f( )$ denotes a function and D denotes CAN bus message density as a function of time.

15. The anomaly monitoring system of claim 14 wherein:
the classifying includes computing the hyperplane curvature parameter $\gamma$ of the RBF kernel as $\gamma = f(\sqrt{Var(D)})$ where Var(D) denotes a variance of the CAN bus message density as a function of time.

16. The anomaly monitoring system of claim 14 wherein the anomaly monitoring method further comprises:
comparing the arbitration identifier (ID) of a message read from the CAN bus against a list of arbitration IDs, wherein the message is either (1) classified as anomalous if the arbitration ID of the message is not contained in the list of arbitration IDs or (2) passed to the classifying operation using the SVM-based classifier with the RBF kernel if the arbitration ID of the message is contained in the list of arbitration IDs.

17. A vehicle comprising:
an automobile, truck, watercraft, or aircraft including a vehicle Controller Area Network (CAN) bus; and
an anomaly monitoring system as set forth in claim 14 comprising an Electronic Control Unit (ECU) operatively connected to the vehicle CAN bus to read messages communicated on the CAN bus.

18. The anomaly monitoring system of claim 14 wherein $f(D)$ comprises a spreading metric measuring a spread of the CAN bus message density D.

19. The anomaly monitoring system of claim 14 wherein $f(D)$ comprises an inverse of a spreading metric measuring a spread of the CAN bus message density D.

20. The system of claim 12 wherein $\gamma=f(D)$ where $f(\ )$ denotes a function and D denotes CAN bus message density in time.

* * * * *